(12) United States Patent
Aritake et al.

(10) Patent No.: US 7,237,359 B2
(45) Date of Patent: Jul. 3, 2007

(54) GLASS RUN FOR MOTOR VEHICLE

(75) Inventors: Masanori Aritake, Aichi-ken (JP);
Kiyotaka Tamaoki, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 431 days.

(21) Appl. No.: 10/852,695

(22) Filed: May 25, 2004

(65) Prior Publication Data
US 2004/0237412 A1    Dec. 2, 2004

(30) Foreign Application Priority Data

| May 26, 2003 | (JP) | ............................. 2003-147442 |
| May 27, 2003 | (JP) | ............................. 2003-148562 |
| May 27, 2003 | (JP) | ............................. 2003-148563 |
| Feb. 9, 2004 | (JP) | ............................. 2004-031866 |

(51) Int. Cl.
*E05D 15/16*    (2006.01)
(52) U.S. Cl. .......................................... 49/441; 49/440
(58) Field of Classification Search ................. 49/440, 49/441, 489.1, 475.1, 495.1
See application file for complete search history.

(56) References Cited

U.S. PATENT DOCUMENTS

| 4,663,888 A | * | 5/1987 | Okamoto ...................... 49/441 |
| 6,131,342 A | * | 10/2000 | Miyamoto et al. ......... 49/484.1 |
| 6,226,926 B1 | | 5/2001 | Aritake et al. |
| 6,389,754 B2 | | 5/2002 | Nozaki |
| 6,625,931 B2 | | 9/2003 | Omori et al. |
| 6,668,488 B2 | | 12/2003 | Nozaki et al. |
| 7,069,967 B2 | * | 7/2006 | Park et al. ................ 144/154.5 |
| 2002/0002796 A1 | | 1/2002 | Hamada et al. |

FOREIGN PATENT DOCUMENTS

| EP | 0 266 982 A2 | 10/1987 |
| FR | 2738278 | 9/1995 |
| JP | A-04-260821 | 9/1992 |
| JP | A-2000-025462 | 7/1998 |
| JP | A-2000-025462 | 1/2000 |
| JP | A-2002-019473 | 7/2000 |
| JP | A-2001-130262 | 5/2001 |
| JP | A-2002-019473 | 1/2002 |

* cited by examiner

*Primary Examiner*—Jerry Redman
(74) *Attorney, Agent, or Firm*—Posz Law Group, PLC

(57) ABSTRACT

A glass run for use in a motor vehicle, which is capable of preventing seal lips from closely contacting inner surface of side walls thereof, and accordingly preventing the generation of noise therein. An opening-side groove is formed in an inner surface of an outside wall near an open end thereof to define a space between the inner surface of the outside wall and a base of the outside seal lip when an end of an outside seal lip contacts the inner surface of the outside wall. And a bottom-side groove is formed in the inner surface of the outside wall so as to receive the end of the outside seal lip which is pushed by the door glass. A protruding part having a rib is further formed in the inner surface of the outside wall so as to contact the widthwise middle of the outside seal lip which is pushed by the door glass.

11 Claims, 4 Drawing Sheets

GLASS RUN FOR MOTOR VEHICLE

CROSS-REFERENCE TO RELATED APPLICATION

This application is related to and claims priority from Japanese patent Applications No. 2003-147442, 2003-148562, 2003-148563 and 2004-031866, incorporated herein by reference.

BACKGROUND OF THE INVENTION

1. Field of the Invention

The present invention relates to a glass run for attachment to an inner periphery of a door frame of a motor vehicle for guiding a door glass as it is raised and lowered.

2. Description of Related Art

As shown in FIG. 1, a glass run 10 is attached to an inner periphery of a door frame 12 of a vehicle door 14 for guiding a door glass 16 which is raised and lowered, and sealing between the door glass 16 and the door frame 12. FIGS. 2 and 3 show examples of the conventional glass run 10 for attachment into a channel 18 provided along the inner periphery of the door frame 12. The glass run 10 is formed by connecting extruded straight parts with molded parts into a configuration conforming to that of the door frame 12.

In addition, a door weather strip (not shown) is attached to an outer periphery of the door frame 12, and/or an opening trim weather strip (not shown) is attached to a flange provided in a door opening portion of a vehicle body, thereby sealing between the vehicle door 14 and the vehicle body.

The glass run 10 includes an outside wall 20, an inside wall 22 and a bottom wall 24, and has a generally U-shaped cross-section. An outside seal lip 26 and an inside seal lip 28 extend from open ends of the outside wall 20 and the inside wall 22 towards an interior of the glass run 10. When the glass run 10 is attached into the channel 18, outer surfaces of the outside wall 20, the inside wall 22 and the bottom wall 24 contact the inner surfaces of the channel 18.

When the door glass 16 is raised, it slides into the interior of the glass run 10, and an end of the door glass 16 is sealed and held by the outside seal lip 26 and the inside seal lip 28 (Publication of unexamined patent application No. 2000-25462, pages 2-3, FIG. 2).

The conventional glass run 10, however, exhibits the following problem. Namely, while a motor vehicle is running at high speeds, the door glass 16 may be drawn outwardly, or may vibrate due to vibrations of the vehicle body, thereby pressing the outside seal lip 26 against the outside wall 20 (Publication of unexamined patent application No. 2002-19473, pages 3-5, FIG. 1(b)).

Accordingly, the outside seal lip 26 may contact an inner surface of the outside wall 20 closely, and is difficult to separate therefrom after the door glass 16 stops pressing the outside seal lip 26. Consequently, sealing between the door glass 16 and the outside seal lip 26, or holding of the door glass 16 with the outside seal lip 26 may become insufficient.

To improve the slidability of the inner surface of the outside wall 20 relative to an end of the outside seal lip 26, the inner surface of the outside wall 20 may be coated with a low friction material such as silicone coating, etc. But, the coating work is troublesome, because the outside seal lip 26 must be turned up upon coating the inner surface of the outside wall 20.

On the other hand, where the coating condition of the low friction material varies, noise may be generated when the door glass 16 shifts inwardly, and the outside seal lip 26 which has contacted the outside wall 20 rapidly separates from insufficiently coated area of the inner surface of the outside wall 20.

In addition, as shown in FIG. 3, where an end 27 of the outside seal lip 26, projects toward the outside wall 20, it contacts and presses the inner surface of the outside wall 20 earlier than the remaining portion of the outside seal lip 26, and accordingly, so-called "bottoming" occurs earlier, as compared with other flat outside seal lips. Consequently, a reaction force from the outside wall 20 increases to press the outside seal lip 26 against the door glass 16 strongly, thereby increasing the sliding resistance between the door glass 16 and the outside seal lip 26. As a result, the door glass 16 may not be raised and lowered smoothly, or there may be generated noise, etc. due to rubbing of the door glass 16 and the outside seal lip 26.

SUMMARY OF THE INVENTION

It is an object of the present invention to provide a glass run for a motor vehicle, which is capable of decreasing the sliding resistance between a door glass and seal lips, thereby enabling the door glass to be raised and lowered smoothly, and preventing side walls of the glass run from closely contacting the seal lips to obstruct the generation of noise in the glass run.

In accordance with a first aspect of the present invention, the glass run for use in a motor vehicle, which is provided along an inner periphery of a door frame of a vehicle door for guiding a door glass as it is raised and lowered, includes an outside wall, an inside wall and a bottom wall which have a generally U-shaped cross-section. The outside wall and the inside wall respectively have an outside seal lip and an inside seal lip, each extending into an interior defined by the outside wall, the inside wall and the bottom wall, thereby sealing a periphery of the door glass. An opening-side groove is provided in an inner surface of the outside wall along a joint with a base of the outside seal lip such that when the outside seal lip is pressed by the door glass, and an end thereof contacts the inner surface of the outside wall, a space is defined between the inner surface of the outside wall and a facing surface of the outside seal lip.

With this arrangement, the outside seal lip and the inside seal lip provided in the outside wall and the inside wall hold an end edge of the door glass, and seal between the door frame and the door glass.

By virtue of the opening-side groove provided in the inner surface of the outside wall, the base of the outside seal lip does not contact the outside wall when the outside seal lip is pushed by the door glass toward the outside wall, and the projecting end of the outside seal lip contacts the inner surface of the outside wall, thereby preventing the generation of such noise which has been generated when the outside seal lip separates from the outside wall in the conventional glass run.

The space provided between the inner surface of the outside wall and the base of the outside seal lip by virtue of the opening-side groove achieves a cushioning operation against the door glass to hold the door glass elastically, and prevents the base of the outside seal lip from contacting the inner surface of the outside wall surely. In addition, when the door glass stops pushing the outside seal lip toward the outside wall, the outside seal lip immediately returns to its original configuration to contact the door glass with good sealing properties.

In accordance with a second aspect of the present invention, the glass run for use in a motor vehicle, which is provided along an inner periphery of a door frame of a vehicle door for guiding a door glass as it is raised and lowered, includes an outside wall, an inside wall and a bottom wall which have a generally U-shaped cross-section. And the outside wall and the inside wall respectively have an outside seal lip and inside seal lip, each extending into an interior defined by the outside wall, the inside wall and the bottom wall, thereby sealing an end of the door glass. A projection having a generally semicircular cross-section is provided in an end of the outside seal lip, and a bottom-side groove is provided in an inner surface of the outside wall such that when the outside seal lip is pressed by the door glass on the outside wall, the projection is accommodated in the bottom-side groove provided in the outside wall.

With this arrangement, the outside seal lip and the inside seal lip provided in the outside wall and the inside wall hold an end edge of the door glass, and seal between the door frame and the door glass, similarly to the arrangement of the first aspect.

By virtue of the projection having a generally semicircular cross-section, which is provided along the end of the outside seal lip, and the bottom-side groove provided in the inner surface of the outside wall, the projection is accommodated in the bottom-side groove of the outside wall when the outside seal lip is pressed by the door glass against the outside wall, whereby the projection of the outside seal lip can be located outwardly, and consequently, so-called "bottoming" of the outside seal lip can be delayed to decrease the reaction force from the outside wall against the outside seal lip. This results in the pushing force of the outside seal lip against the door glass can be decreased, thereby reducing the sliding resistance of the door glass furthermore.

It is preferable that the bottom-side groove has dimensions at least equal to those of the projection having a generally semicircular cross-section provided in the outside seal lip.

With this arrangement, the projection having a generally semicircular cross-section provided in the outside seal lip can be accommodated in the bottom-side groove provided in the outside wall entirely. Accordingly, the projection of the outside seal lip can move by a longer distance, thereby minimizing the pushing force of the outside seal lip against the door glass, which is caused by the reaction force applied from the outside wall.

It is preferable that depressions are provided in the inner surface of the outside wall so as to extend in a longitudinal direction thereof.

With this arrangement, by virtue of the depressions, the contacting area of the outside wall and the outside seal lip can be reduced, and consequently, the closely contacting force therebetween can be decreased, whereby the outside seal lip can be prevented from contacting the outside wall closely, and noise can be prevented from generating when the outside seal lip separates from the outside wall.

In addition, since the contacting area of the outside wall and the outside seal lip can be reduced, the low friction members to be provided in the inner surface of the outside wall can be reduced or omitted.

It is preferable that a bending part is provided along an open end of the outside wall so as to bend outwardly of the outside wall. The bending part is made thinner than the remaining part of the outside wall to define an opening-side groove.

With this arrangement, the bending part along with an outside cover projection can cover an open end of a side wall of the channel of the door frame, while facilitating the provision of the space between the open end of the outside wall, and the base of the outside seal lip.

In addition, since the bending part bends outwardly from about the open end of the outside wall, and the outside seal lip is provided so as to extend from an end of the bending part toward the bottom wall, the base of the outside seal lip can be located outwardly of the extension of the outside wall, whereby when the door glass is raised to contact the outside seal lip of the glass run in an outwardly shifting state, the door glass can be guided inwardly of the outside wall.

Since the bending part is made thinner than the remaining part of the outside wall, the bending part can deform freely in accordance with the variation of the dimensions of the channel, thereby covering the open end of the channel sufficiently.

It is preferable that the outside seal lip has a widthwise length less than that of the inside seal lip, and curves convexly into the interior of the glass run.

With this arrangement, the raised door glass can be guided near the outside wall of the door frame, and accordingly, a difference in level between the door glass and the door frame can be reduced, thereby decreasing the air resistance therein, and making the body surface flat, and accordingly, improving the appearance of the body surface.

In addition, since the outside seal lip curves convexly into the interior of the glass run, the outside seal lip can contact the door glass in a line contact to decrease the sliding resistance of the outside seal lip against the door glass, thereby enabling smooth raising and lowering of the door glass.

It is preferable that a low friction member is provided on each of inner surfaces of the outside wall, the inside wall and the bottom wall along with the outside seal lip and the inside seal lip.

With this arrangement, since the low friction member is provided on each of all contacting surfaces between the door glass and the glass run, and between the seal lips and the side walls, the sliding friction between the door glass and the glass run, and between the seal lips and the side walls can be reduced, thereby enabling smooth raising and lowering of the door glass, and preventing noise from being generated when the seal lips contact the side walls, and separate therefrom.

In accordance with a third aspect of the present invention, the glass run for use in a motor vehicle, which is provided along an inner periphery of a door frame of a vehicle door for guiding a door glass as it is raised and lowered, includes an outside wall, an inside wall and a bottom wall which have a generally U-shaped cross-section. And the outside wall and the inside wall respectively have an outside seal lip and inside seal lip, each extending into an interior defined by the outside wall, the inside wall and the bottom wall, thereby sealing an end of the door glass. A protruding part is provided in an inner surface of the outside wall of the glass run for attachment to at least vertical sides of the door frame in a position contacting the outside seal lip, so as to extend continuously in a longitudinal direction, and a rib is provided in a surface of the protruding part so as to extend continuously in a longitudinal direction of the outside wall.

With this arrangement, the outside seal lip and the inside seal lip provided in the outside wall and the inside wall hold an end edge of the door glass, and seal between the door frame and the door glass.

By virtue of the protruding part provided in the inner surface of the outside wall of the glass run for attachment to at least vertical sides of the door frame, the protruding part of the outside wall can support the outside seal lip which is pushed by the door glass drawn outwardly while running at high speeds, whereby the outside seal lip can contact the outside wall in a line contact without contacting the same closely in a face contact. In addition, by virtue of the rib of the protruding part, the contacting area of the outside wall and the outside seal lip can be reduced, and consequently, the closely contacting force therebetween can be decreased. And the outside seal lip can be prevented from generating noise when the outside seal lip leaves the outside wall.

It is preferable that the protruding part is provided in the inner surface of the outside wall of the glass run for attachment to the vertical sides and upper sides of the door frame so as to contact about a widthwise middle of the outside seal lip apart from the end thereof.

With this arrangement, a level difference is generated between the protruding part and the part which the end of the outside seal lip contacts, and accordingly, when the door glass pushes the outside seal lip, the end of the outside seal lip can be accommodated in the outside wall, whereby the door glass can be prevented from pushing the outside seal lip strongly.

Since the protruding part is provided in the glass run for attachment to the vertical sides and upper sides of the door frame, when the outside seal lip repeatedly contacts and separates from the door glass which is raised and lowered, the outside seal lip can be prevented from keeping contacting the outside seal wall closely, and from abruptly peeling off the outside wall to cause noise.

In addition, since the outside seal lip is prevented from keeping contacting the outside wall, the outside seal lip can contact the door glass surely, thereby exhibiting excellent sealing properties.

It is preferable that ribs are provided in a surface of the protruding part so as to extend in a longitudinal direction of the outside wall.

With this arrangement, the contacting area of the outside wall and the outside seal lip can be reduced, and consequently, the closely contacting force therebetween can be decreased, whereby the outside seal lip can be prevented from contacting the outside wall closely.

In addition, the outside seal lip can be surely supported by the ribs of the protruding part over an entire surface thereof. The contacting pressure can be distributed to each rib, whereby the contacting pressure applied to each rib is decreased, and accordingly, the deformation of each rib is restrained to decrease the contacting area with the outside seal lip.

Other objects, features, and characteristics of the present invention will become apparent upon consideration of the following description and the appended claims with reference to the accompanying drawings, all of which form a part of this specification.

DETAILED DESCRIPTION OF THE PREFERRED EMBODIMENTS

Figure 1:
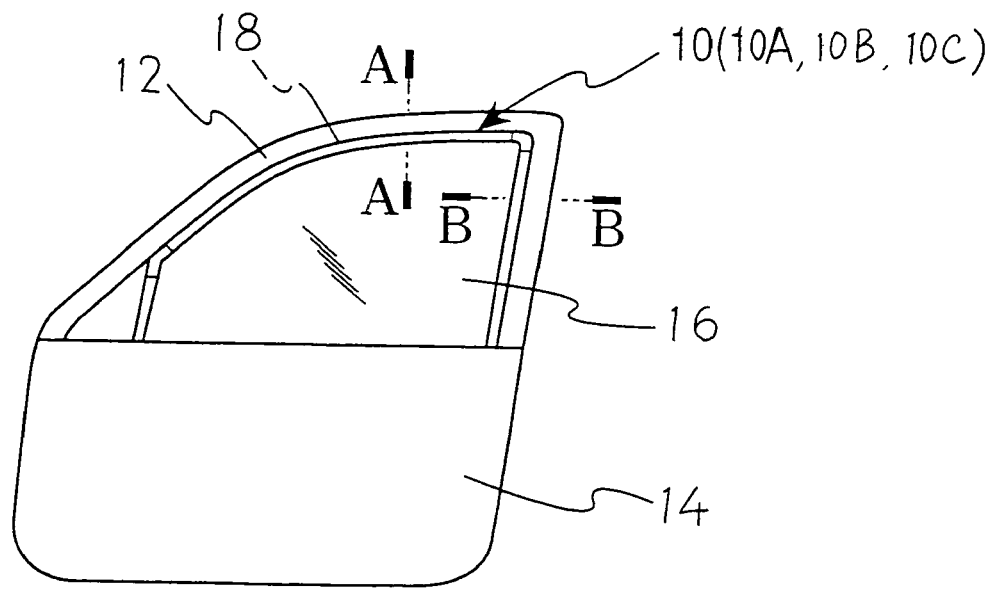
FIG. 1 is a front view of a door of a motor vehicle.
Figure 2:
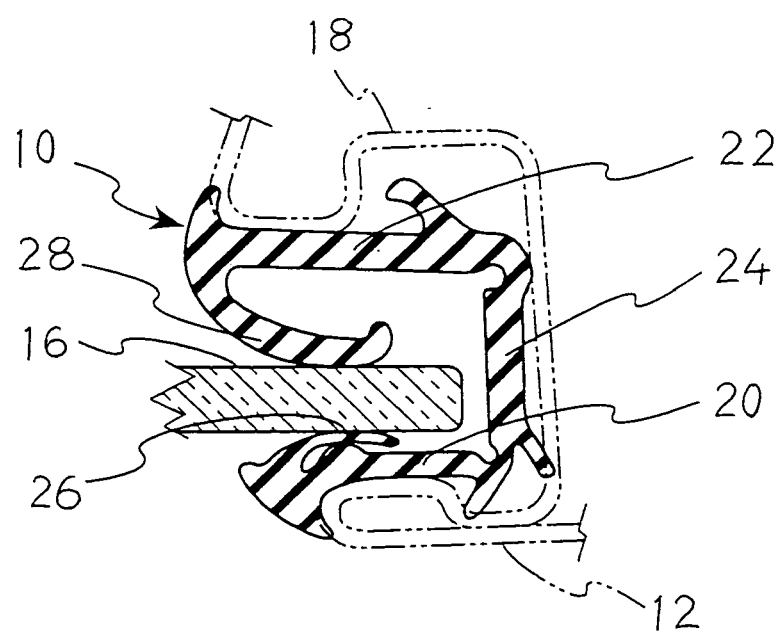
FIG. 2 is a cross-sectional view of a conventional glass run, which is taken along the line of B-B of FIG. 1.
Figure 3:
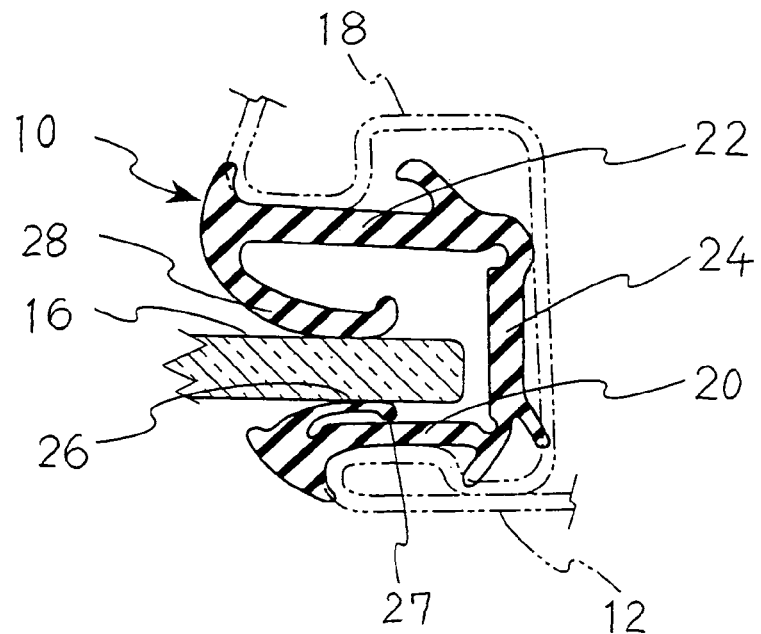
FIG. 3 is a cross-sectional view of another conventional glass run, which is taken along the line of B-B of FIG. 1.

Embodiments of the present invention will be explained with reference to FIGS. 1 and 4 through 7. As shown in FIG. 1, a door frame 12 is provided in an upper part of a vehicle door 14, and a door glass 16 is slidably attached along the door frame 12. A channel 18 is provided in an inner periphery of the door frame 12, and a glass run 10A is attached into the channel 18 to guide the door glass 16 as it is raised and lowered, and seal between the door glass 16 and the door frame 12.

The glass run 10A includes straight parts formed by extrusion and molded parts formed by molding to connect the extruded straight parts to each other. The extruded straight parts are respectively attached to an upper side, a rear vertical side and a front vertical side of the door frame 12. These extruded straight parts are connected to each other with the molded parts so as to confirm to the door frame 12.

Figure 4:
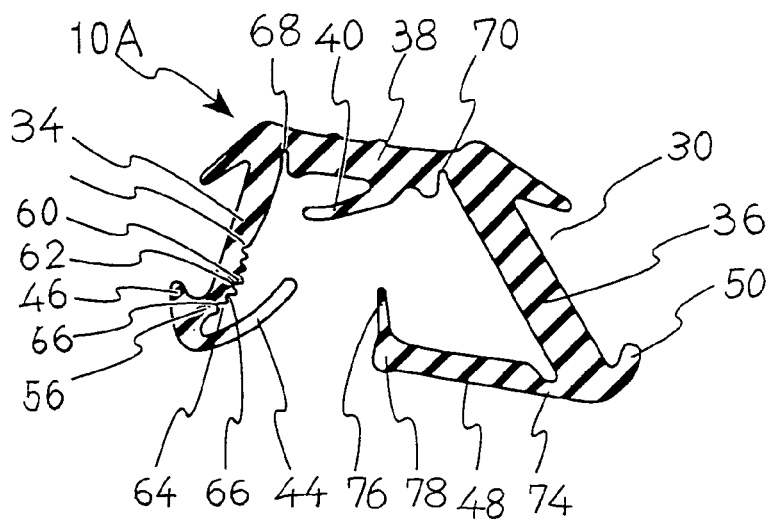
FIG. 4 is a cross-sectional view of one embodiment of a glass run in accordance with the present invention, which is prior to attachment to an upper side of a door frame.
Figure 5:
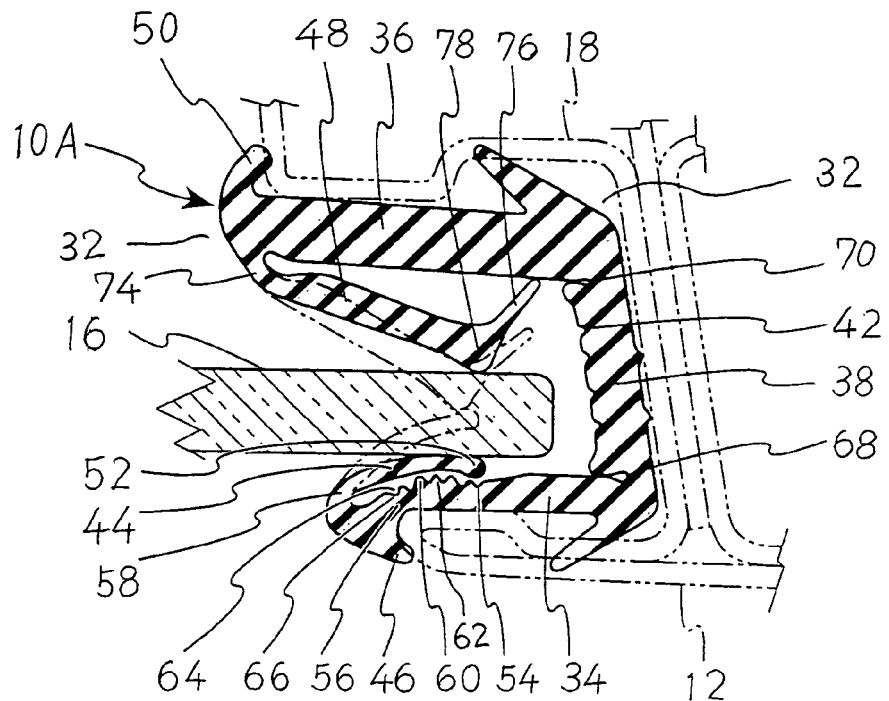
FIG. 5 is a cross-sectional view of one embodiment of a glass run in accordance with the present invention, which is after attachment to a rear vertical side of a door frame.

FIG. 4 is a cross-sectional view of an extruded part 30 of the glass run 10A, which is taken along the line A-A of FIG. 1, and FIG. 5 is a cross-sectional view of an extruded part 32 of the glass run 10A, which is taken along the line B-B of FIG. 1.

As shown, the extruded parts 30 and 32 of the glass run 10A respectively include an outside wall 34, an inside wall 36 and a bottom wall 38, and have a generally U-shaped cross-section. The extruded part 30 for attachment to the upper side of the door frame 12 has a lip 40 projecting from the bottom wall 38, whereas the extruded part 32 for attachment to the vertical side of the door frame 12 has depressions 42 in the bottom wall 38. The remaining cross-section is generally identical over the entire length of the glass run 10A.

An outside seal lip 44 extends from an open end of the outside wall 34 into an interior of the glass run 10A, and an outside cover projection 46 extends from the open end of the outside wall 34 outwardly of the vehicle body. And an inside seal lip 48 extends from an open end of the inside wall 36 into an interior of the glass run 10A, and an inside cover projection 50 extends from the open end of the inside wall 36 inwardly of the vehicle body.

When the glass run 10A is attached into the channel 18, an outer surface of the outside wall 34 and a rear surface of the outside cover projection 46 contact an outside wall of the channel 18, and an outer surface of the inside wall 36 and a rear surface of the inside cover projection 50 contact an inside wall of the channel 18, whereby open ends of the outside wall and the inside wall of the channel 18 are covered with the glass run 10A, and the glass run 10A is held by the channel 18.

The outside seal lip 44 has a thickness and widthwise length, which are less than those of the inside seal lip 48. The outside seal lip 44 thus arranged enables the door glass 16 to approach the outside wall of the channel 18, thereby reducing the difference in level between the door glass 16 and the door frame 12. Consequently, air resistance therein is decreased, and a smooth body surface without unevenness is effected to improve the aesthetic appearance therearound.

In addition, the outside seal lip 44 curves convexly towards the door glass 16 which is in a raised position, and can readily flex elastically to contact the door glass 16 in a line contact, whereby when the door glass 16 is raised and lowered, resultant sliding resistance of the outside seal lip 44 against the door glass 16 can be decreased to ensure a smooth sliding of the door glass 16.

Figure 6:
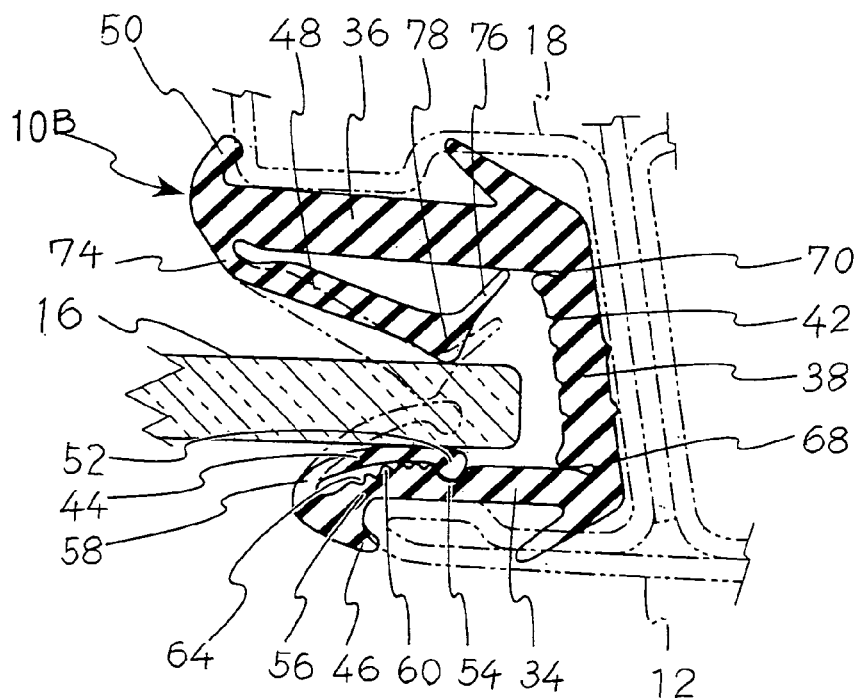
FIG. 6 is a cross-sectional view of another embodiment of a glass run in accordance with the present invention, which is after attachment to a rear vertical side of a door frame.
Figure 7:
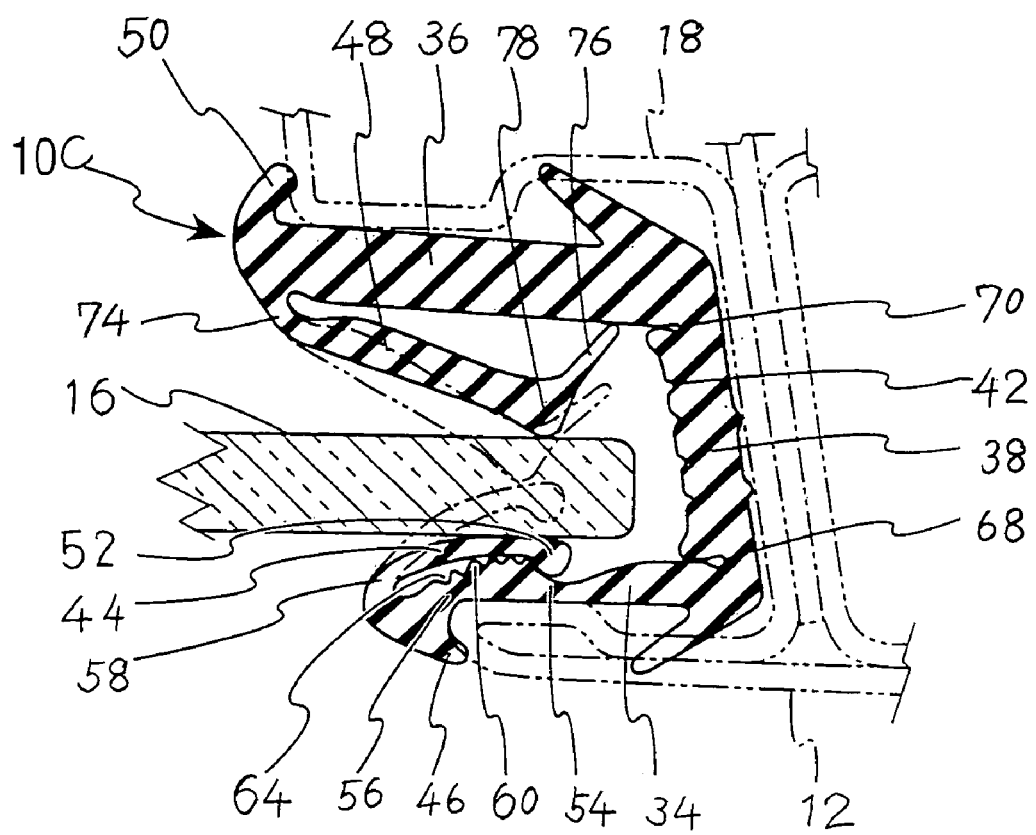
FIG. 7 is a cross-sectional view of still another embodiment of a glass run in accordance with the present invention, which is after attachment to a rear vertical side of a door frame.

As shown in FIG. 4, along the upper side of the door frame 12, the outside seal lip 44 has an identical thickness from a base end to a tip end thereof, whereas, as shown in FIGS. 5 through 7, along the vertical sides of the door frame 12, a projection 52 having about a semicircular cross-section projects from a tip end of the outside seal lip 44.

While the motor vehicle is running with the door glass 16 slightly lowered, the door glass 16 vibrates in a direction of the width of the vehicle body due to vibrations, etc. of the vehicle body. In particular, in the vertical side of the door glass run 10A, the outside seal lip 44 is pushed by the door glass 16, and the projection 52 of the outside seal lip 44 contacts the inner surface of the outside wall 34. In the embodiments shown in FIGS. 5 and 6, the inner surface of the outside wall 34 of the glass runs 10A and 10B is provided with a bottom side-groove 54 having a cross-section approximately conforming to the semicircular cross-section of the projection 52. The groove 54 extends continuously in a longitudinal direction of the outside wall 34.

When the outside seal lip 44 is pressed against the outside wall 34 by the door glass 16, the projection 52 of the outside seal lip 44 is fitted in the groove 54 of the outside wall 34. Consequently, the occurrence of so-called "bottoming" of the outside seal lip 44 is delayed, and the reaction force from the outside wall 34 is decreased to reduce the force applied from the outside seal lip 44 to the door glass 16. Accordingly, the sliding resistance between the outside seal lip 44 and the door glass 16 can be decreased.

In the embodiment shown in FIG. 7, the inner surface of the outside wall 34 of a glass run 10C, which is continuous with the groove 54, is inclined, and the inclined inner surface is coated with a low friction material. With this arrangement, the projection 52 of the out side seal lip 44 is guided by the inclined inner surface and the low friction material, and consequently, can readily enter the groove 54 securely.

An opening-side groove 64 is formed along an open end of the outside wall 34 to make it thinner than the remaining part thereof, and a bending part 56 extends outwardly from the thin open end of the outside wall 34 to cover an end of the outside wall of the channel 18. The opening-side groove 64 facilitates the formation of a space between the inner surface of the outside wall 34 and a facing surface of the outside seal lip 44 along its base end 58.

The outside seal lip 44 and the outside cover projection 46 respectively extend from an end of the bending part 56. In the vertical side of the glass run 10A, the base end 58 of the outside seal lip 44 is located outside an extension of the outside wall 34 when the door glass 16 is raised to contact the outside seal lip 44. Accordingly, when an end of the door glass 16 shifts outwardly, the door glass 16 can be guided by the outside seal lip 44 into the interior of the glass run 10A, thereby ensuring the smooth sliding of the door glass 16, and stable holding thereof at its closed position.

Since the bending part 56 is thinner than the remaining part of the outside wall 34, as described above, it can flex and cover an opening of the channel 18 irrespective of variations in the dimensions of the channel 18.

A protruding part 60 is provided in the inner surface of the outside wall 34 so as to continuously extend in a longitudinal direction thereof. The protruding part 60 is provided near the open end of the outside wall 34 so as to contact about a widthwise middle of the outside seal lip 44 which is pushed by the door glass 16.

The protruding part 60 includes a plurality of ribs 62 which project inwardly of the inner surface of the outside wall 34. The bottom-side groove 54 and the opening-side groove 64 are provided on both sides of the protruding part 60.

When the door glass 16 is drawn outwardly to push the outside seal lip 44, the outside seal lip 44 contacts the protruding part 60 of the outside wall 34, and the projection 52 of the outside seal lip 44 is fitted in the groove 54 which extends on the bottom-side of the protruding part 60, whereby the occurrence of so called "bottoming" of the outside seal lip 44 is delayed, and the reaction force from the outside wall 34 against the projection 52 of the outside seal lip 44 is decreased. Consequently, the pushing force of the outside seal lip 44 against the door glass 16 does not increase so as not to obstruct shifting and sliding of the door glass 16.

As described above, when the outside seal lip 44 is pressed against the outside wall 34 by the door glass 16, the projection 52 of the outside seal lip 44 is accommodated in the groove 54 provided in the outside wall 34. Accordingly, the pushing force of the projection 52 of the outside seal lip 44 against the door glass 16, and the sliding resistance between the outside seal lip 44 and the door glass 16 can be decreased.

Depressions 66 are provided between adjacent ribs 62 of the inner surface of the outside wall 34. When the outside seal lip 44 is pushed by the door glass 16 toward the outside wall 34, and the outside seal lip 44 contacts the inner surface of the outside wall 34, the contacting area therebetween decreases to prevent closely contacting of the outside seal lip 44 with the outside wall 34.

A base end of the bending part 56 is made thin by the groove 64 which extends along the ribs 62. Accordingly, the bending part 56 can readily flex in conformity with the contour of the channel 18 to contact the channel 18 closely.

When the outside seal lip 44 is pressed against the outside wall 34 by the door glass 16, the groove 64 also serves to prevent the outside seal lip 44 from contacting the inner surface of the outside wall 34 closely.

In these embodiments, the ribs 62 and the depressions 66 are provided in the inner surface of the outside wall 34. These ribs 62 and depressions 66 may not be provided where the outside seal lip 44 does not contact the outside wall 34 closely.

Grooves 68 and 70 are provided along joints between the outside wall 34 and the bottom wall 38 and between the inside wall 36 and the bottom wall 38. These grooves 68 and 70 enable the outside wall 34 and the inside wall 36 to bend flexibly relative to the bottom wall 38, whereby the glass run 10A can be readily fitted in the channel 18 of the door frame 12.

As shown in FIG. 4, the lip 40 projects from the bottom wall 38 of the glass run 10A for attachment to the upper side of the door frame 12. When the door glass 16 is raised to contact the bottom wall 38 of the glass run 10A, the lip 40 achieves a cushioning operation against the door glass 16. Accordingly, the door glass 16 can be prevented from pushing the bottom wall 38 strongly. A low friction member may be applied to a surface of the lip 40 to decrease the sliding resistance against the door glass 16

As shown in FIGS. 5 through 7, each of the glass runs 10A, 10B and 10C for attachment to the vertical sides of the door frame 12 is not provided with any lip corresponding to the lip 40 of FIG. 4. Instead, a plurality of depressions 42 may be provided in the inner surface of the bottom wall 38 so as to extend in a longitudinal direction thereof to decrease the sliding resistance, or a low friction member may be applied to the inner surface of the bottom wall 38.

Any material exhibiting a low friction resistance against the door glass 16 may be used as the low friction member. TPO sheets, unwoven fabrics of fluorocarbon resin, polyethylene sheets, silicone coats, urethane coats, etc. may be used.

The inside wall 36 has a generally plate-shaped cross-section. As described above, the outer surface of the inside wall 36 and the rear surface of the inside cover projection 50 are brought into contact with the inside wall of the channel 18, whereby the glass run 10A is held in the channel 18.

The inside seal lip 48 extending from the open end of the inside wall 36 has a generally plate-shaped cross-section. A base end 74 of the inside seal lip 48 is made thin to enable the inside seal lip 48 to bend toward the inside wall 36.

A projection 76 projects from a tip end 78 of the inside seal lip 48 at about right angles thereto and extends toward the bottom wall 38.

When the glass run 10A (10B and 10C) is attached into the channel 18, and the inside seal lip 48 is pushed by the door glass 16 toward the inside wall 36, the inside seal lip 48 turns about the base end 74 thereof. And where the door glass 16 greatly vibrates, an end of the projection 76 of the inside seal lip 48 contacts the inside wall 36.

Hereinafter, the producing method of the glass run 10A (10B and 10C) will be explained. First, straight parts are formed of a soft type solid material by extrusion into a generally U-shaped cross-section of which side walls are slightly spread apart toward open ends thereof. This cross-section enables the glass run to exhibit a pressing force against the side walls of the channel 18 upon attachment therein, and facilitates the coating work of the low friction material on the outside wall 34, the inside wall 36, the bottom wall 38, outside seal lip 40 and the inside seal lip 48.

Examples of the solid material for the straight parts include synthetic rubber such as EPDM rubber, thermoplastic elastomer such as polyolefin elastomer, or a soft synthetic resin such as soft vinyl chloride, etc.

In the case of synthetic rubber, after extrusion, it is heated for vulcanization in a vulcanization chamber with hot air, high frequency wave, etc, whereas in the case of thermoplastic elastomer or soft synthetic resin, it is cooled for solidification. Then, the extruded straight parts are cut to have a desired length.

Next, molded parts are formed by placing ends of the extruded straight parts in a mold, and injecting a solid material for the molded parts in a cavity of the mold. The molded parts have about an identical cross-section to that of the extruded straight parts. It is preferable that the material for the molded parts is of the same kind as the solid material for the extruded parts. In the case of synthetic rubber, after injected into the mold, the mold is heated for vulcanization of the synthetic rubber. Due to vulcanization, the extruded parts and the molded parts, each being composed of an identical material or materials of the same kind, can become an integral body. In the case of thermoplastic elastomer or soft synthetic resin, the extruded parts and the molded parts are welded to each other with heat and pressure of a molten material injected into the mold.

As described above, in the embodiments of the present invention, the bending part 56 is provided along the open end of the outside wall 34 of the glass run 10A, the protruding part 50 having an arc-shaped cross-section is provided adjacent to the bending part 56, and a rib is provided in the surface of the protruding part 50. This arrangement prevents the base end of the outside seal lip from contacting the inner surface of the outside wall, and reduces the contacting area between the end of the outside seal lip and the inner surface of the outside wall. Consequently, the outside seal lip can be surely prevented from contacting the outside wall closely, and accordingly, the occurrence of noise which has been encountered when the outside seal lip leaves the inner surface of the outside wall is prevented.

In addition, the groove 54 is provided adjacent to the protruding part 60. Consequently, the projecting end 52 of the outside seal lip 44 can be fitted in the groove 54. In a modified embodiment, an inclined surface is provided between the protruding part 60 and the groove 54. With this arrangement, the projecting end 52 of the outside seal lip 44 can slide on the inclined surface and fit in the groove 54.

Furthermore, by virtue of the bending part 56 provided in the outside wall 34, the outside seal lip 52 can be extended close to the outside wall 34 without contacting the outside wall closely. And by virtue of the groove 54 provided in the outside wall 34, the occurrence of bottoming of the outside seal lip 44 is delayed. Accordingly, when the door glass shifts outwardly, the increase of the reaction force applied from the outside seal lip 44 to the door glass is prevented.

As described above, in accordance with the present invention, an opening-side groove is provided in an inner surface of an outside wall of a glass run so that when an outside seal lip is pressed by the door glass against the inner surface of the outside wall, a base of the outside seal lip is prevented from contacting the inner surface of the outside wall, and accordingly noise is prevented from being generated when the outside seal lip leaves the outside wall.

In addition, in accordance with the present invention, a projection having a generally semicircular cross-section is provided along the end of the outside seal lip, and a bottom-side groove is provided in the inner surface of the outside wall for accommodating the projection of the outside seal lip. When the outside seal lip is pushed by the door glass, and contacts the outside wall, the projection of the outside seal lip is accommodated in the bottom-side groove of the outside wall to reduce the reaction force therefrom, and consequently, the sliding resistance between the outside seal lip and the door glass is decreased, thereby enabling smooth raising and lowering of the door glass.

Furthermore, in accordance with the present invention, a protruding part including a plurality of ribs is provided in the inner surface of the outside wall of the glass run. When the outside seal lip is pressed by the door glass against the outside wall, the outside seal lip is prevented from keeping contacting the outside wall so as to be free from the generation of noise which has been conventionally generated when the outside seal lip separates from the inner surface of the outside wall of the glass run. Accordingly, the glass run exhibits good sealing properties between the door glass and the door frame.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. A glass run for use in a motor vehicle, which is provided along an inner periphery of a door frame of a vehicle door for guiding a door glass as it is raised and lowered, wherein the glass run comprises an outside wall, an inside wall and a bottom wall and has a generally U-shaped cross-section, said outside wall having an outside seal lip, and said inside wall having an inside seal lip, said outside seal lip and said inside seal lip respectively extending into an interior defined by said outside wall, said inside wall and said bottom wall and sealing an end of the door glass, wherein an opening-side groove is provided on an inner surface of said outside wall along a joint with a base of said outside seal lip, a bottom-side groove is provided on said inner surface of said outside wall to extend in a longitudinal direction thereof, a projection having a generally semicircular cross-section is provided on an end of said outside seal lip such that when said outside seal lip is pressed by the door glass, an end of said projection contacts said outside wall and is matingly accommodated in said bottom-side groove provided on said outside wall and a space is defined between said inner surface of said outside wall and a facing surface of said outside seal lip by said opening-side groove, and depressions are provided on said inner surface of said outside wall, and said depressions extend in a longitudinal direction of said outside wall.

2. A glass run as claimed in claim 1, wherein said bottom-side groove has dimensions at least equal to those of said projection having a generally semicircular cross-section provided in said outside seal lip.

3. A glass run as claimed in claim 1, further comprising a bending part which is provided along an open end of said outside wall so as to bend outwardly, said bending part being made thinner than the remaining part of said outside wall by said opening-side groove.

4. A glass run as claimed in claim 1, wherein said outside seal lip has a widthwise length less than that of said inside seal lip and curves convexly toward the door glass.

5. A glass rum as claimed in claim 1, further comprising a low friction member which is provided on each of inner surfaces of said outside wall, said inside wall and said bottom wall, and surfaces of said outside seal lip and said inside seal lip, which face the door glass.

6. A glass run for use in a motor vehicle, wherein the glass run is provided along an inner periphery of a door frame of a vehicle door for guiding a door glass as it is raised and lowered, wherein the glass run comprises an outside wall, an inside wall and a bottom wall and has a generally U-shaped cross-section, said outside wall having an outside seal lip, and said inside wall having an inside seal lip, said outside seal lip and said inside seal lip respectively extending into an interior defined by said outside wall, said inside wall and said bottom wall and sealing an end of the door glass, wherein an opening-side groove provided on an inner surface of said outside wall along a joint with a base of said outside seal lip, a bottom-side groove is provided on said inner surface of said outside wall to extend in a longitudinal direction thereof, a projection having a generally semicircular cross-section is provided on an end of said outside seal lip such that when said outside seal lip is pressed by the door glass, an end of said projection contacts said outside wall and is matingly accommodated in said bottom-side groove provided on said outside wall, and a space is defined between said inner surface of said outside wall and a facing surface of said outside seal lip by said opening-side groove, a protruding part is provided on an inner surface of said outside wall of said glass run for attachment to at least vertical sides of the door frame in a position contacting said outside seal lip so as to extend continuously in a longitudinal direction of said outside wall, and a rib is further provided on a surface of said protruding part so as to extend continuously in a longitudinal direction of said outside wall.

7. A glass run as claimed in claim 6, wherein said protruding part is provided in said inner surface of said outside wall of said glass run for attachment to said vertical sides and upper side of said door frame so as to contact about a widthwise middle of said outside seal lip apart from an end of said outside seal lip.

8. A glass run as claimed in claim 6, further comprising a plurality of ribs in a surface of said protruding part so as to extend in a longitudinal direction of said outside wall.

9. A glass run as claimed in claim 6, further comprising a bending part which is provided along an open end of said outside wall so as to bend outwardly, said bending part being made thinner than the remaining part of said outside wall, and said outside seal lip extending from an end of said bending part.

10. A glass run as claimed in claim 6, wherein said outside seal lip has a widthwise length and a thickness less than those of said inside seal lip, and curves convexly toward the door glass.

11. A glass run as claimed in claim 6, further comprising a low friction member which is provided on each of inner surfaces of said outside wall, said inside wall, an inner surface of said bottom wall, and surfaces of said outside seal lip and said inside seal lip, which face the door glass.

* * * * *